US009940377B1

(12) United States Patent
Sait

(10) Patent No.: US 9,940,377 B1
(45) Date of Patent: Apr. 10, 2018

(54) INSTANT COPIES OF STORAGE VOLUMES

(71) Applicant: Amazon Technologies, Inc., Seattle, WA (US)

(72) Inventor: Abdul Sathar Sait, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 443 days.

(21) Appl. No.: 14/487,954

(22) Filed: Sep. 16, 2014

(51) Int. Cl.
*G06F 17/30* (2006.01)
*H04L 29/08* (2006.01)

(52) U.S. Cl.
CPC .... *G06F 17/30575* (2013.01); *H04L 67/1097* (2013.01)

(58) Field of Classification Search
CPC ......... G06F 17/30067; G06F 17/30442; G06F 17/30575; G06F 17/30286; H04L 67/1097
USPC ........................................ 707/610, 646, 647
See application file for complete search history.

(56) References Cited

U.S. PATENT DOCUMENTS

| 8,489,799 | B2* | 7/2013 | Factor et al. ................... 711/6 |
| 8,849,758 | B1* | 9/2014 | Sivasubramanian et al. ................... 707/636 |
| 8,984,243 | B1* | 3/2015 | Chen et al. ................... 711/162 |
| 2013/0246723 | A1* | 9/2013 | Factor et al. ................... 711/162 |
| 2014/0344526 | A1* | 11/2014 | Brown et al. ................... 711/141 |
| 2015/0112931 | A1* | 4/2015 | Bourbonnais et al. ........ 707/626 |

OTHER PUBLICATIONS

Zhenhai Zhao et al., CAWRM: A remote mirroring system based on AoDI volume, 2011, 99-104.*

* cited by examiner

*Primary Examiner* — Jean B Fleurantin
(74) *Attorney, Agent, or Firm* — Baker & Hostetler LLP

(57) ABSTRACT

Techniques are described for allocating computing storage capacity to customers of a provider network. Storage capacity that is allocated to a customer is backed up with a replica of the allocated storage capacity. A request is received for a copy of contents of the allocated storage capacity. Responsive to the indication, the requested copy is provided and is configured to reference the replica when the requested copy is accessed.

20 Claims, 10 Drawing Sheets

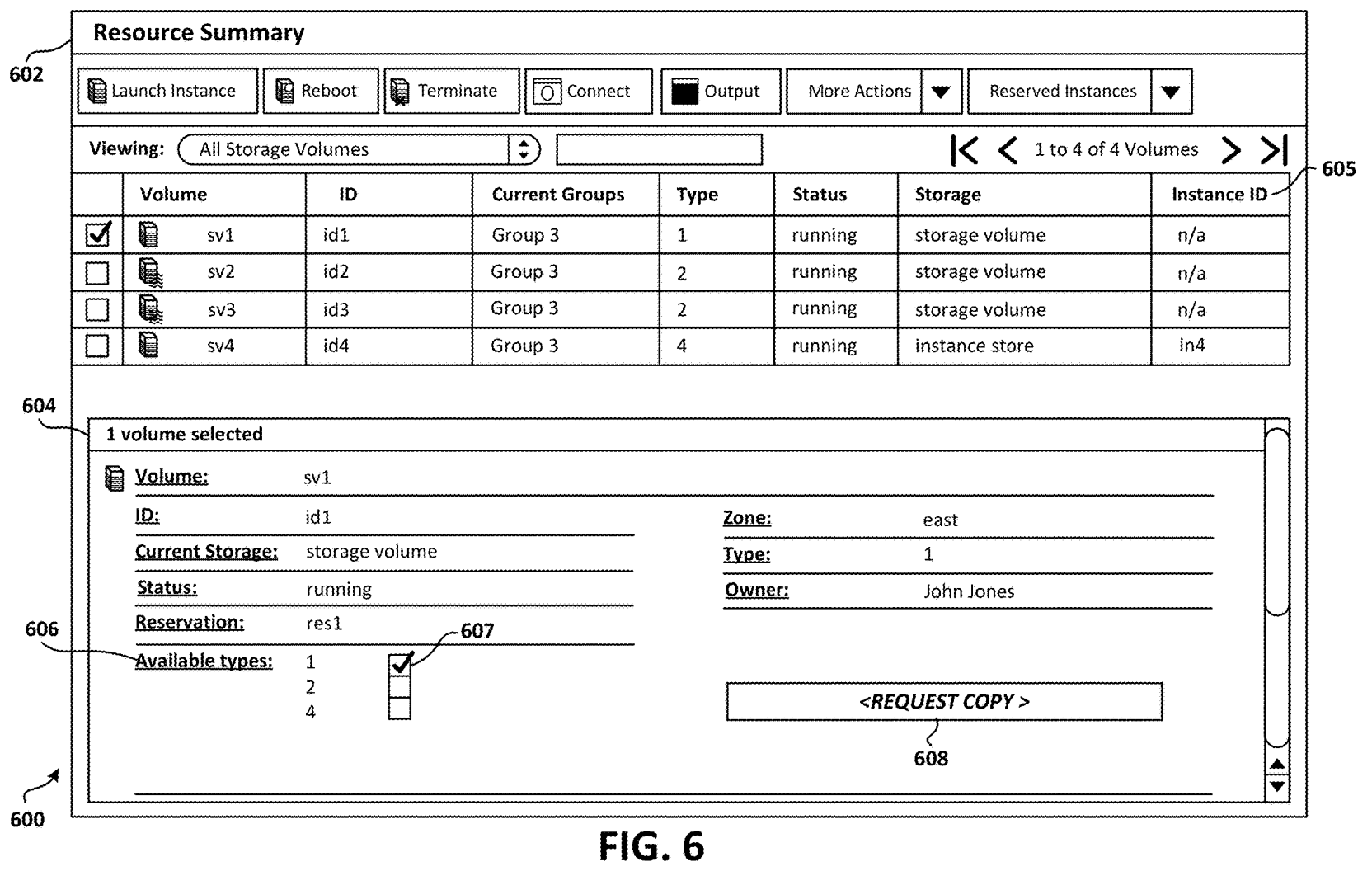

Resource Summary — 602

[Launch Instance] [Reboot] [Terminate] [Connect] [Output] [More Actions ▶] [Reserved Instances ▶]

Viewing: (All Storage Volumes) — 604

|   | Volume | ID  | Current Groups | Type | Status  | Storage        | Instance ID |
|---|--------|-----|----------------|------|---------|----------------|-------------|
| ☑ | sv1    | id1 | Group 3        | 1    | running | storage volume | n/a         |
| ☐ | sv2    | id2 | Group 3        | 2    | running | storage volume | n/a         |
| ☐ | sv3    | id3 | Group 3        | 2    | running | storage volume | n/a         |
| ☐ | sv4    | id4 |                | 4    | running | instance store | in4         |

|< < 1 to 4 of 4 Volumes > >|  — 605

1 volume selected — 606

Volume: sv1
ID: id1
Current Storage: storage volume
Status: running
Reservation: res1 [☑☐☐] — 607
Available types: 1
                 2
                 4

Zone: east
Type: 1
Owner: John Jones

[ <REQUEST COPY> ] — 608

FIG. 6

INSTANT COPIES OF STORAGE VOLUMES

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

Some virtualization technologies are capable of providing virtual resources that span two or more physical resources, such as a single virtual machine with multiple virtual processors that span multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage, and/or other network-accessible resources may allow customers to reserve or purchase access to resources in various resource acquisition modes. The computing resource provider may provide facilities for customers to select and launch the desired computing resources, deploy application components to the computing resources, and maintain an application executing in the environment. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like.

A service provider, such as an entity that operates a provider network, may offer computing resources, such as computing instances and storage resources, to customers (customers may also be referred to as entities or users). A customer may be any person or entity who accesses computing resources of a service provider and has a predefined relationship with the service provider. The service provider may, for example, provide a web services platform. Multiple customers may access a web services platform via a computing node and issue instructions to the web services platform. A web services platform may be called a multi-tenant web services platform to denote that multiple customers may access the platform. In turn, the web services platform may respond to these instructions by performing computing operations on one or more of a plurality of computing nodes that make up the web services platform. The web services platform may remotely store files for a customer that that customer may later access. Other types of resources may be offered by the provider network.

BRIEF DESCRIPTION OF DRAWINGS

FIG. 6 is an example user interface for managing storage resources in accordance with the present disclosure;

DETAILED DESCRIPTION

Figure 1:
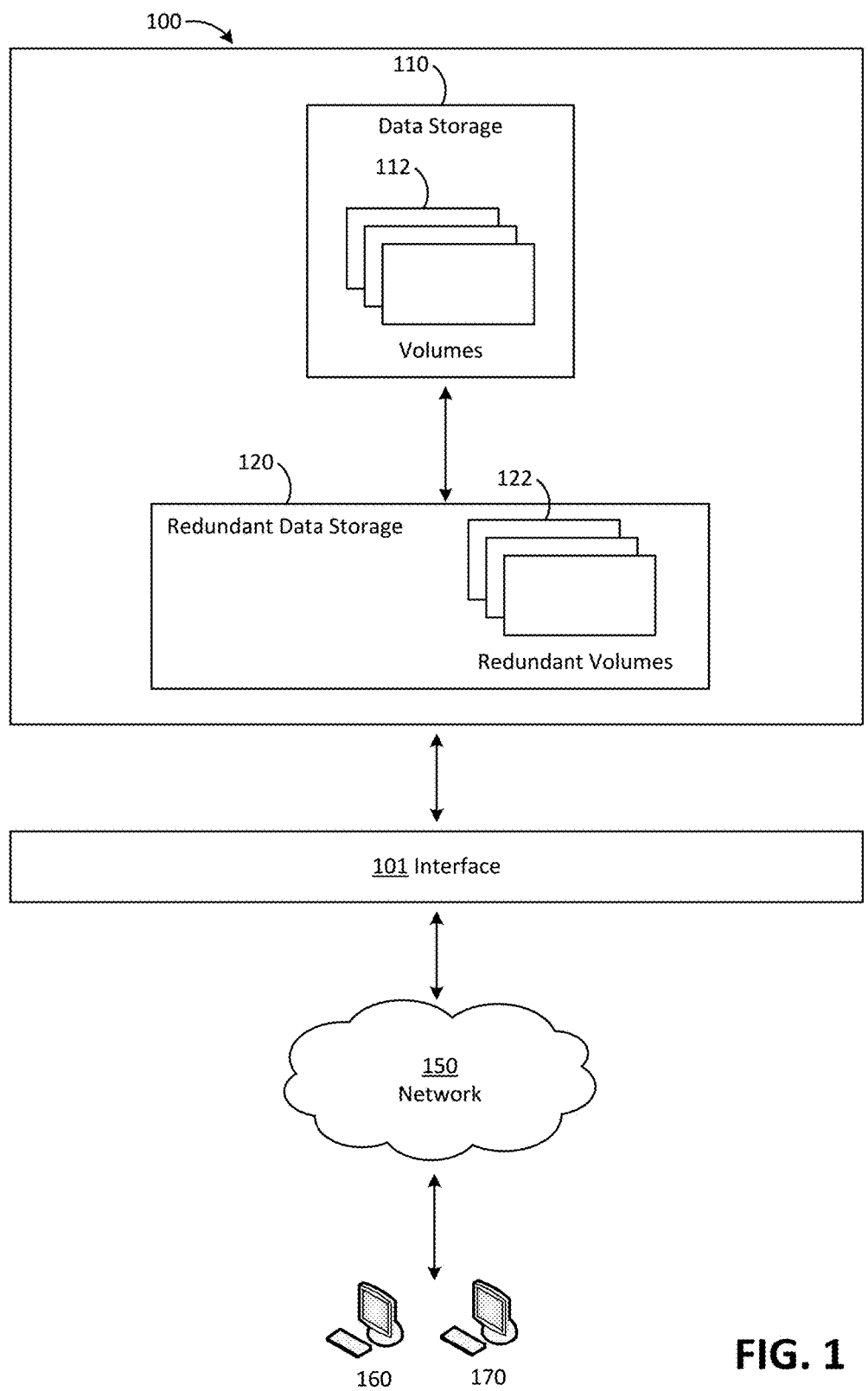
FIG. 1 is a diagram illustrating a mechanism for managing storage resources in accordance with the present disclosure.

A provider network, such as a multi-tenant web services platform, may provide storage services for customers. For example, block-level storage volumes may be provided to customers for storage needs or for use with the customer's computing instances. The storage volumes may persist independently from the lifetime of the customer's instances. The provider network may also allocate storage to instances regardless if the instance is associated with a storage volume. When a customer does not acquire a storage volume, the customer may nevertheless be allocated an instance store (e.g., one or more temporary volumes implemented on the local host) when the customer's instance is launched.

In some example embodiments, storage volumes may be configured as network attached devices and may be used to provide flexibility when managing instances by using the persistent storage volumes to back up a customer's instances. Customers frequently need to create exact duplicates of a storage volume. Such exact duplicates, or clones, may be desired for production storage to create similar environments for development and code testing, patch testing, security and performance testing, creating duplicate environments for load distribution, and replicating the same environment for training purposes, to name a few. For example, when a customer has implemented a production system, the customer may want to test updates and patches in order to address any unforeseen issues prior to applying the patch to the production system. Therefore, it can be useful for the customer to run a test environment that includes replicas of the production environment. In order to do so, replication of the storage volumes is needed. However, replication of storage volumes can take a significant amount of time.

In various embodiments described further in this disclosure, methods and systems are disclosed for providing such duplicate or cloned storage volumes. In one example, a duplicate or cloned storage volume may be provided instantaneously by a storage system with redundancy where redundant storage volumes back each storage volume presented to the user. In such a system with redundant volumes, all writes to the customer's storage volume are written simultaneously to both volumes (i.e., the active storage volume and the redundant storage volume) so that both volumes are synchronized. Reads may be performed from a primary volume or distributed across both volumes.

In one embodiment, a storage volume may be associated with a customer of the provider network. The storage volume may be, for example, a storage volume associated with a computing instance. The storage volume may be hosted on a storage device separate from the computing device hosting the computing instance, and may persist independently from the life of the computing instance. The data stored in the persistent storage volume may be made available to the instance store and vice versa. The provider network may generate and maintain a redundant copy of the customer's storage volume. The redundant storage volume may be continuously updated so as to maintain an exact replica of the customer's storage volume. The redundant storage volume may be maintained in a physically and geographically diverse location for fault tolerance and reliability.

In an embodiment, when the customer submits a request for a copy or clone of the storage volume, the provider network may create a new storage volume and present the new storage volume to the customer which points to the redundant storage volume. In this way, the requested copy can be provided quickly while pointers to the redundant storage volume provide access to data in the redundant storage volume. In this way, the customer may have instant access to the requested copy or clone without the need to create a new copy of the clone. A new redundant copy of the generated copy may then be generated. Data may be continuously copied from the redundant copy to the new storage volume until the generated copy has all the data from the redundant copy without the need for the pointers. When a portion of the original storage volume is to be written to, the corresponding portion from the redundant copy can be written to the new storage volume before the portion is written to. Once the new storage volume has all of the data from the redundant copy, the data dependency between the redundant copy and the new storage volume is terminated.

FIG. 1 is a diagram illustrating a system 100 that includes a network 150 that may include one or more computers, such as computers 160 and 170. According to one embodiment, system 100 may be configured to provide computing services to a computer user (not shown) via computers 160 and 170. For example, a set of remote access enterprise applications may be provided to a group of users who may, for example, be employees of an enterprise customer.

FIG. 1 also illustrates storage resources 110 that provide block storage resources, such as storage volumes 112. FIG. 1 also illustrates redundant storage resources 120 that provide backup redundant storage volumes to backup storage volumes 112, such as redundant storage volumes 122. A user at computer 160 or 170 may send a request a copy of one of the storage volumes 112 that are associated with the user. The request may be sent to an interface 101 of a web service platform that provides and manages services and applications. The interface 101 may provide application programming interfaces (APIs) and other interfaces for providing access to services provided by resources, such as hosts 102 and storage resources 110. For example, interface 101 can receive requests from computer 160 or 170 for a copy of a storage volume 112. In addition, in some embodiments the API can receive a policy that specifies conditions that the web services platform can use to determine conditions under which the user can be allocated the requested copy.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Systems and methods in accordance with various embodiments are operable to management access to resources, such as data storage. In at least some embodiments, these approaches include providing a block data storage service that uses multiple server storage systems to reliably store block data that may be accessed and used over one or more networks by any of various users, applications, processes, and/or services. Users of the block data storage service may each create one or more persistent storage volumes that each have a specified amount of block data storage space, and may initiate use of such a persistent storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local persistent storage volumes over one or more networks may each have an associated node manager that manages the access to those non-local volumes by the program, such as a node manager module that is provided by the block data storage service and/or that is operated in conjunction with one or more Block Data Service (BDS) System Manager modules. For example, a first user who is a customer of the block data storage service may create a first persistent storage volume and execute one or more program copies on one or more computing nodes that are instructed to access and use the first volume (e.g., in a serial manner, in a simultaneous or other overlapping manner, etc.). When an application executing on a computing node initiates use of a non-local volume, the application may mount or otherwise be provided with a logical block data storage device that is local to the computing node and that represents the non-local volume, such as to allow the executing program to interact with the local logical block data storage device in the same manner as any other local hard drive or other physical block data storage device that is attached to the computing node (e.g., to perform read and write data access requests, to implement a file system or database or other higher-level data structure on the volume, etc.). For example, in at least some embodiments, a representative logical local block data storage device may be made available to an executing program via use of an appropriate technology, such as Global Network Block Device (GNBD) technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or computing node) so as to perform the interactions on that stored volume copy on behalf of the executing program. Furthermore, in at least some embodiments, at least some of the described techniques for managing access of applications and services to non-local block data storage volumes are automatically performed by embodiments of a node manager module.

In at least some embodiments, persistent storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and, in at least some embodiments, the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service (PES) system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine computing nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use Logical Volume Manager (LVM) technology.

In at least some embodiments, some or all persistent storage volumes have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments. The server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to persistent storage volumes by moving or otherwise replicating volume copies when server block data storage systems become unavailable, the block data storage service may perform other actions in other situations to maintain access of executing programs to persistent storage volumes. For example, if a first executing program unexpectedly becomes unavailable, in some embodiments the block data storage service and/or program execution service may take actions to have a different second executing program (e.g., a second copy of the same program that is executing on a different host computing system); and attach to some or all persistent storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all persistent storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of Redundant Array of Independent (or Inexpensive) Disks (RAID) systems and/or dedicated Storage Area Networks (SANs) and at a much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees, and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a one-time purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies, by allowing them to use one or more created volumes, etc.), whether as a one-time purchase fee, an ongoing rental fee, or on another ongoing subscription basis.

In some embodiments, one or more application programming interfaces (APIs) may be provided by the block data storage service, program execution service, and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy, or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the block data storage service and/or program execution service.

Figure 2:
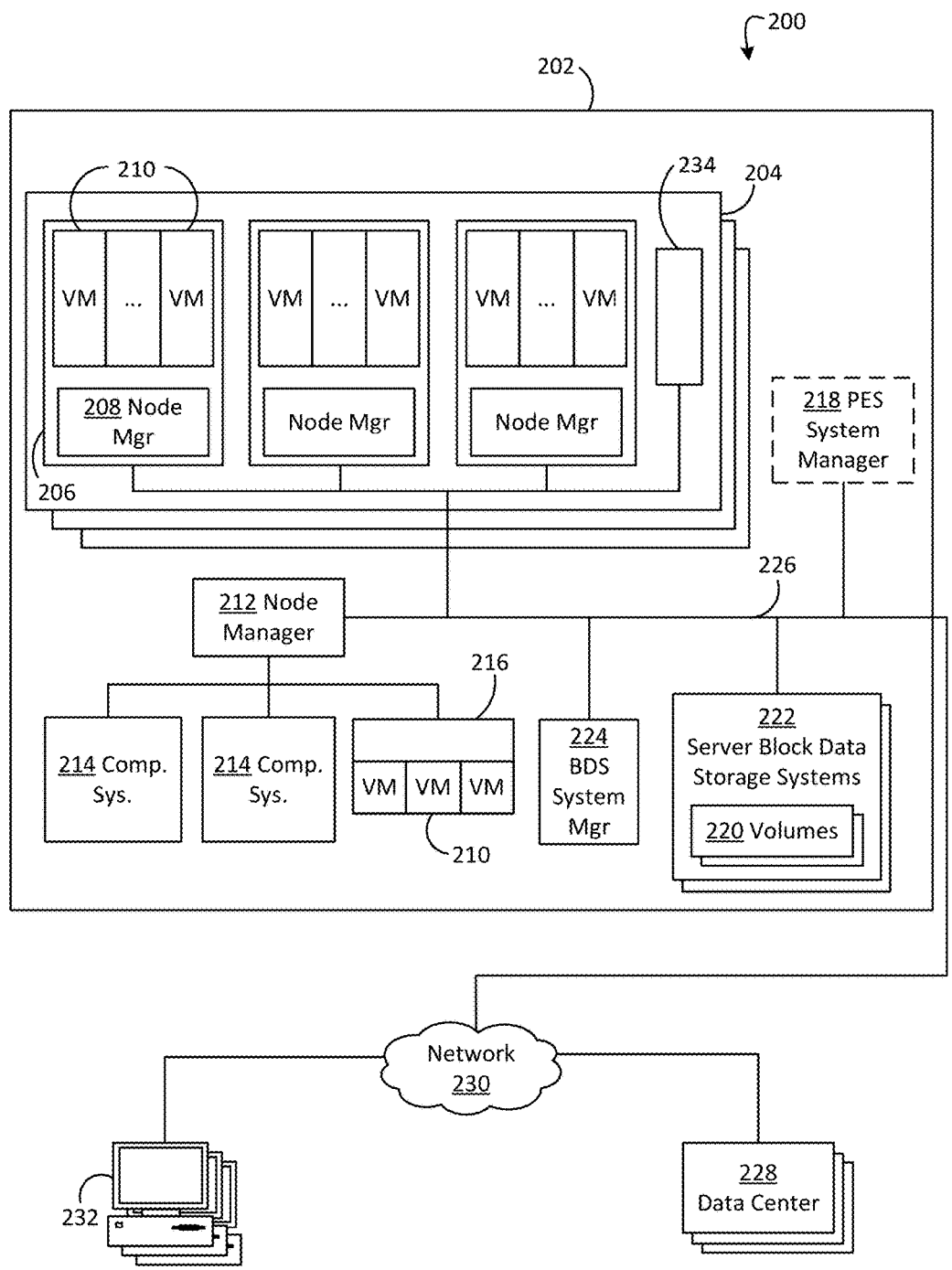
FIG. 2 depicts an example services platform that provides a block data storage service.

FIG. 2 depicts an example network services platform that provides a block data storage service. This network services platform may use block storage devices to store data, such as the block storage volumes of FIGS. 1 and 3, and may implement the operating procedures of FIGS. 7-9.

Environment 200 of FIG. 2 provides multiple computing systems that are operable to access non-local block data storage, which, in one embodiment is block storage under the control of a block data storage service. Environment 200 also provides multiple computing systems that are operable to execute various programs, applications, and/or services, which in one embodiment comprises one or more computing services under the control of one or more program execution services. In particular, in this example, a program execution service manages the execution of programs on various host computing systems located within a data center 202, and a block data storage service uses multiple other block data storage systems at the data center to provide reliable non-local block data storage to those executing programs. Multiple remote archival storage systems external to the data center may also be used to store additional copies of at least some portions of at least some persistent storage volumes.

In this example platform of FIG. 2, a data center 202 includes a number of racks, each rack including a number of host computing systems 206, as well as an optional rack support computing system 234 in this example embodiment. The host computing systems 206 on the illustrated rack 204 each host one or more virtual machines 210 in this example, as well as a distinct node manager module 208 associated with the virtual machines on that host computing system to manage those virtual machines.

One or more other host computing systems 216 may also each host one or more virtual machines 210 in this example. Each virtual machine 210 may act as an independent computing node for executing one or more program copies (not shown) for a user (not shown), such as a customer of the program execution service. In addition, this example data center 202 further includes additional host computing systems 214 that do not include distinct virtual machines, but may nonetheless each act as a computing node for one or more programs (not shown) being executed for a user. As used herein, a computing node may be implemented on a wide variety of computing environments, such as commodity-hardware computers, virtual machines, computing clusters, and computing appliances. Any of these computing environments may, for convenience, be described as computing nodes.

In this example platform of FIG. 2, a node manager module 212 executing on a computing system (not shown) distinct from the host computing systems 214 and 216 is associated with those host computing systems to manage the computing nodes provided by those host computing systems, such as in a manner similar to the node manager modules 208 for the host computing systems 206. The rack support computing system 234 may provide various utility services for other computing systems local to its rack (e.g., long-term program storage, metering and other monitoring of program execution and/or of block data storage access performed by other computing systems local to the rack, etc.), as well as possibly to other computing systems located in the data center. Each computing system may also have one or more locally attached storage devices (not shown), such as to store local copies of programs and/or data created by or otherwise used by the executing programs, as well as various other components.

In this example platform of FIG. 2, an optional computing system is also illustrated and executes a programmable execution system (PES) system manager module 218 for the program execution service to assist in managing the execution of programs on the virtual machine instances provided by the host computing systems located within data center 202 (or optionally on computing systems located in one or more other data centers 228, or other remote computing systems 232 external to data center 202). As discussed in greater detail elsewhere, a PES system manager module 218 may provide a variety of services in addition to managing execution of programs, including the management of user accounts (e.g., creation, deletion, billing, etc.), the registration, storage, and distribution of programs to be executed, the collection and processing of performance and auditing data related to the execution of programs, the obtaining of payment from customers or other users for the execution of programs, etc. In some embodiments, the PES system manager module 218 may coordinate with the node manager modules 208 and 212 to manage program execution on computing nodes associated with the node manager modules 208 and 212. In other embodiments, the PES system manager module 218 may manage the execution of programs without the assistance of the node manager modules 208 and 212.

In this example platform of FIG. 2, the data center 202 also includes a computing system that executes a BDS system manager module 224 for the block data storage service to assist in managing the availability of block data storage to programs executing on computing nodes provided by the host computing systems located within the data center (or optionally on computing systems located in one or more other data centers 228, or other remote computing systems 232 external to the data center 202). BDS system manager module 224 is depicted here as a separate component for ease of understanding and illustration. It may be appreciated, as with the other components, that there are embodiments where the various nodes communicate directly with server block data storage systems 222. In particular, in this example, the data center 202 includes a pool of multiple server block data storage systems 222, which each have local block storage for use in storing one or more volume copies 220. Access to the volume copies 220 is provided over the internal network(s) 226 to programs executing on virtual machines 210, host computing systems 206, and host computing systems 214.

As discussed in greater detail in the paragraphs herein below, a BDS system manager module 224 may provide a variety of services related to providing block data storage functionality, including, for example: the management of accounts (e.g., creation, deletion, billing, etc.); the creation, use, and deletion of persistent storage volumes and snapshot copies of those volumes; the collection and processing of performance and auditing data related to the use of persistent storage volumes and snapshot copies of those volumes; the obtaining of payment from entities for the use of persistent storage volumes and snapshot copies of those volumes; and so on. In some embodiments, the BDS system manager module 224 may coordinate with the node manager modules 208 to manage use of volumes by programs executing on associated computing nodes, while in other embodiments the node manager modules 208 may not be used to manage such volume use. In addition, in other embodiments, one or more BDS system manager modules 224 may be structured in other manners, such as to have multiple instances of the BDS system manager executing in a single data center 202 (e.g., to share the management of block data storage by programs executing on the computing nodes provided by the host computing systems located within the data center), and/or such as to have at least some of the functionality of a BDS system manager module 224 being provided in a distributed manner by software executing on some or all of the server block data storage systems 222 (e.g., in a peer-to-peer manner, without any separate centralized BDS system manager module 224).

In this example platform of FIG. 2, the various host computing systems, block data storage systems, and computing systems are interconnected via one or more internal networks 226 of the data center, which may include various networking devices (e.g., routers, switches, gateways, etc.) that are not shown. In addition, the internal networks 226 are connected to an external network 230 (e.g., the Internet or other public network), and the data center 202 may further include one or more other devices (not shown) at a connection point between the data center 228 and an external network 230 (e.g., network proxies, load balancers, network address translation devices, etc.). The data center 202 is connected via the external network 230 to one or more other data centers 228 that each may include some or all of the computing systems and storage systems illustrated with respect to data center 202, as well as other remote computing systems 232 external to the data center. The other remote computing systems 232 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or alternatively on one or more computing systems of the data center, as described in greater detail elsewhere. Furthermore, while not illustrated here, in at least some embodiments, at least some of the server block data storage systems 222 may further be connected with one or more other networks or other connection mediums, such as a high-bandwidth connection over which the block data storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, block data storage systems and other devices may be much larger than what is depicted in FIG. 2. For example, as one illustrative embodiment, there may be approximately 4,000 computing systems per data center, with at least some of those computing systems being host computing systems that may each host fifteen virtual machines, and/or with some of those computing systems being block data storage systems that may each store several volume copies. If each hosted virtual machine executes one program, then such a data center may execute as many as sixty thousand program copies at one time. Furthermore, hundreds or thousands (or more) of volumes may be stored on the block data storage systems, depending on the number of server storage systems, size of the volumes, and number of mirror copies per volume. It will be appreciated that in other embodiments, other numbers of computing systems, programs and volumes may be used.

Figure 3:
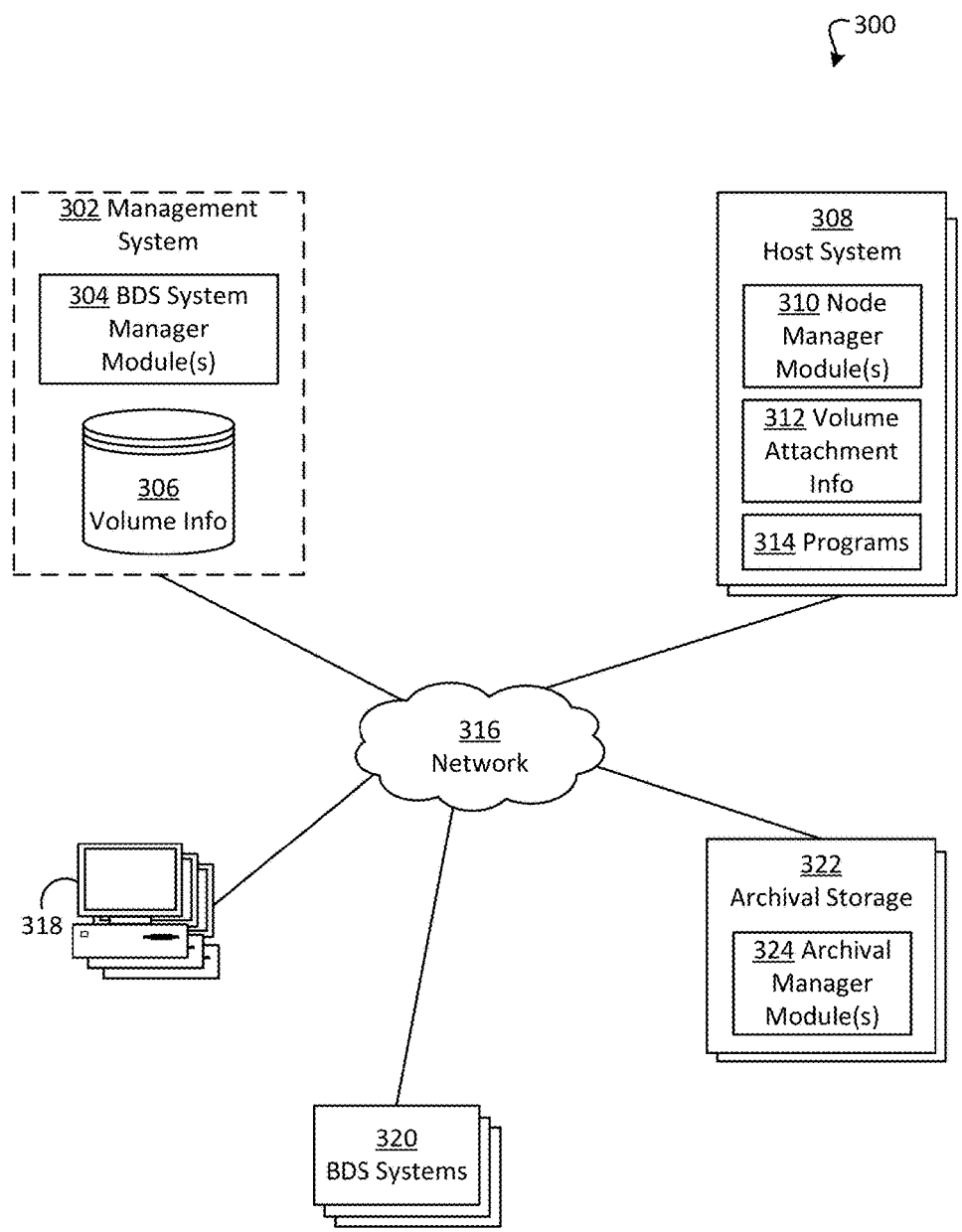
FIG. 3 depicts an example system that provides a network-accessible block-storage service.

FIG. 3 depicts an example a system that provides a network-accessible block-storage service. This system provides a network-accessible block-storage service may use block storage devices to store data, such as the block storage volumes of FIGS. 1-2, and may implement the operating procedures of FIGS. 7-9. In embodiments, and as described in more detail below, components of FIG. 3 may be implemented in components of FIG. 1 and/or FIG. 2. For example, management system 302 and host computing systems 308 of FIG. 3 may be implemented in data center 202 of FIG. 2.

FIG. 3 depicts environment 300, which includes computing systems suitable for managing the provision and use of persistent storage volumes (i.e., non-local block data storage) functionality to entities that can be used in accordance with various embodiments. In this example, a management system 302, such as one or more server computers including one or more externally facing interfaces (not shown), is programmed to execute an embodiment of at least one BDS system manager module 304 to manage provisioning of block data storage functionality to programs executing on host computing systems 308 and/or on at least some other computing systems 318, such as to persistent storage volumes (not shown) provided by the block data storage systems 320. Each of the host computing systems 308 in this example also executes an embodiment of a node manager module 310 to manage access of programs 314 executing on the host computing system at least to some of the persistent storage volumes, such as in a coordinated manner with the BDS system manager module 304 over a network 316 (e.g., an internal network of a data center, not shown, that includes the computing systems 302, 308, 320, and optionally at least some of the other computing systems 318). In other embodiments, some or all of the node manager modules 310 may instead manage one or more other computing systems (e.g., the other computing systems 318).

In addition, multiple block data storage systems 320 are illustrated that each can store at least some of the persistent storage volumes (not shown) used by the executing programs 314, with access to those volumes also being provided over the network 316 in this example. One or more of the block data storage systems 320 may also each store a server software component (not shown) that manages operation of one or more of the block data storage systems, as well as various information (not shown) about the data that is stored by the block data storage systems. Thus, in embodiments, the management system 302 of FIG. 3 may correspond to the BDS system manager module 224 of FIG. 2, the node manager modules 310 of FIG. 3 may correspond to one or more of the node manager modules 208 and 212 of FIG. 2, and/or one or more of the block data storage systems 320 of FIG. 3 may correspond to the block data storage systems 222 of FIG. 2. In addition, in this example embodiment, multiple archival storage systems 322 are illustrated, which may store data, encode data, replicate data, and/or snapshot copies and/or other copies of at least portions of at least some persistent storage volumes stored on the block data storage systems 320. The archival storage systems 322 may also interact with some or all of the computing systems 302, 308, and 320, and in embodiments may be remote archival storage systems (e.g., of a remote storage service, not shown) that interact with computing systems over one or more other external networks (not shown).

The other computing systems 318 may further include other proximate or remote computing systems of various types in at least some embodiments, including computing systems via which customers or other users of the block data storage service interact with the management and/or host systems. Furthermore, one or more of the other computing systems 318 may further execute a PES system manager module to coordinate execution of programs on the host computing systems 308 and/or other computing systems 318, or the management system 302 or one of the other illustrated computing systems may instead execute, such a PES system manager module, although a PES system manager module is not illustrated in this example.

In the illustrated embodiment, a node manager module 310 is executing in memory in order to manage one or more other programs 314 executing in memory on the computing system, such as on behalf of customers of the program execution service and/or block data storage service. In some embodiments, some or all of the host computing systems 308, which may be physical host computers or computing devices that execute a host operating system, may host multiple instances—where, in embodiments, an instance is a virtual machine instance supported by a hypervisor or an instance running on bare metal—where there is no hypervisor used to support execution of the instance. Where computing systems 308 host instances, each of the executing programs 314 may be an entire instance (e.g., with an operating system and one or more application programs) executing on a distinct hosted computing node. The node manager module 310 may similarly be executing on another instance, such as a privileged hypervisor that manages the other hosted instances. In other embodiments, the executing instances of programs 314 and the node manager module 310 may execute as distinct processes on a single operating system (not shown) executed on a single computing system of host computing systems 308.

The archival storage system 322 is operable to execute at least one archival manager module 324 in order to manage operation of one or more of the archival storage systems, such as on behalf of customers of the block data storage service and/or of a distinct storage service that provides the archival storage systems. In other embodiments, at least one archival manager module 324 may instead be executing on another computing system, such as one of the other computing systems 318 or on the management system 302 in conjunction with the BDS system manager module 304. In addition, while not illustrated here, in some embodiments, various information about the data that is stored by the archival storage systems 322 may be maintained in storage for the archival storage systems or elsewhere.

The BDS system manager module 304 and node manager modules 310 may take various actions to manage the provisioning and/or use of reliable block data storage functionality to entities (e.g., executing programs), as described in greater detail elsewhere. In this example, the BDS system manager module 304 may maintain a database 306 that includes information about volumes stored on the block data storage systems 320 and/or on the archival storage systems 322 (e.g., for use in managing the volumes), and may further store various other information (not shown) about other aspects of the block data storage service. In other embodiments, information about volumes may be stored in other manners, such as in a distributed manner by node manager modules 310 on their computing systems and/or by other computing systems. In addition, in this example, each node manager module 310 on a host computing system 308 may store information 312 about the current volumes attached to the host computing system and used by the executing programs 314 on the host computing system, such as to coordinate interactions with the block data storage systems 320 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

Environments such as those illustrated with respect to FIGS. 1-3 can be used to provide and manage compute resources shared among various entities, such as customers of datacenter 100. In one embodiment, a virtualized storage system can be provided using a number of data servers, each having a number of storage devices (e.g., storage disks) attached thereto. The storage system can expose the storage to the customers as a web service, for example. Customers then can submit web service requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 3, for example, a customer can make a web service call into an appropriate API of an interface of the system (e.g., interface 101 of FIG. 1) to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via web services, which enables the customer to specify the amount of storage to be allocated, such as a value between 1 gigabyte (GB) and 1 terabyte (TB), in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters—such as an instance identifier, a volume identifier, and a device name, depending on factors, such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionalities, such as building a file system, using the data volume as raw storage for a data system, or any other such activity that would normally be performed with a conventional storage device. While the instance is attached to the volume, a customer can call a "ChangeVolumeType" or similar API using parameters—such as an instance identifier, a volume identifier, and an identifier—to change the instance from a persistent storage volume-backed instance to an instance that uses an instance store as its primary storage. After the call is made, components of the control plane cause the node manager to allocate an instance store for the instance and begin copying the data in the volume to local storage. The node manager can also cause input/output operations of the instance to be directed to the instance store. When the customer no longer requires the data volume or the data is copied to the instance store, or for any other appropriate reason, the customer can call a "DetachVolume" or similar API, which can cause the association of the instance to that volume to be removed. In embodiments, the customer may then attach a new instance or perform any of a number of other such activities. Since the data volume will fail independently of the instances in some embodiments, the customer can attach a volume to a new instance if a currently associated instance fails.

Figure 4:
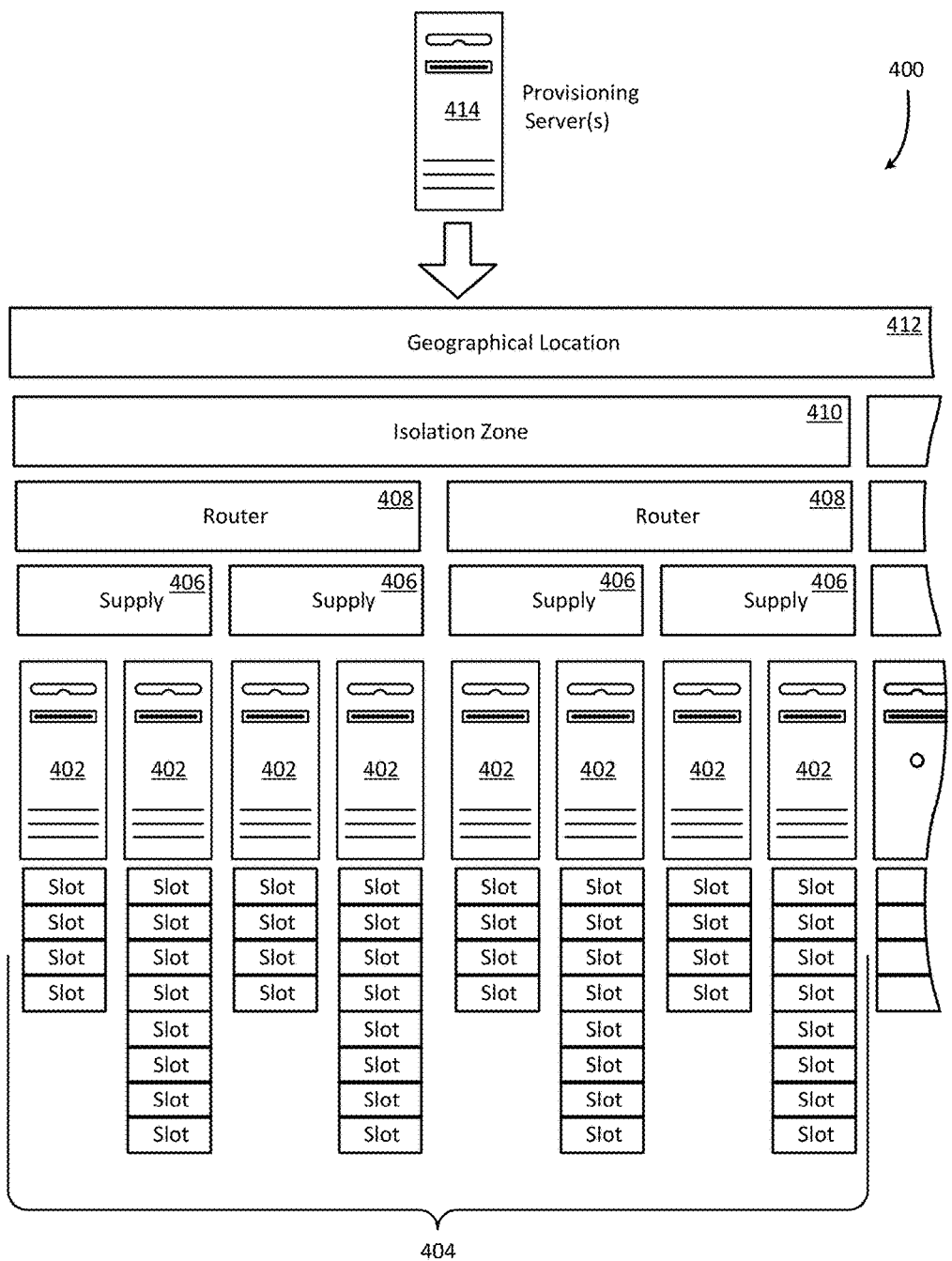
FIG. 4 is a diagram illustrating a system for providing storage resources in accordance with the present disclosure.

In some embodiments, such as in FIG. 4, a data center 400 may be viewed as a collection of shared computing resources and/or shared infrastructure. For example, as shown in FIG. 4, a data center 400 may include virtual machine slots 404, physical hosts 402, power supplies 406, routers 408, isolation zones 410, and geographical locations 412. A virtual machine slot 404 may be referred to as a slot or as a resource slot. A physical host 402 may be shared by multiple virtual machine slots 404, each slot 404 being capable of hosting a virtual machine, such as a guest domain. Multiple physical hosts 402 may share a power supply 406, such as a power supply 406 provided on a server rack. A router 408 may service multiple physical hosts 402 across several power supplies 406 to route network traffic. An isolation zone 410 may service many routers 408, the isolation zone 410 being a group of computing resources that may be serviced by redundant resources, such as a backup generator. Multiple isolation zones 410 may reside at a geographical location 412, such as a data center 400. A provisioning server 414 may include a memory and processor configured with instructions to analyze user data and rank available implementation resources using determined roles and shared resources/infrastructure in the calculation. The provisioning server 414 may also manage workflows for provisioning and deprovisioning computing resources as well as detecting health and/or failure of computing resources.

A provisioning server 414 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 402 that shares a router 408 with a second system may be more proximate to the second system than to a third system only sharing an isolation zone 410. Depending on an application, it may be desirable to keep the distance low to increase throughput or high to increase durability. In another embodiment, the distance may be defined in terms of unshared resources. For example, two slots 404 sharing a router 408 may have a distance of a physical host 402 and a power supply 406. Each difference in resources may be weighted differently in a distance calculation.

A placement calculation may also be used when selecting a prepared resource to transfer to a client account. In one embodiment, a client requests a virtual machine having an operating system. The provisioning server 414 may determine that the request may be satisfied with a staged volume in a slot 404. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 414 may determine that a placement near other existing volumes is desirable for latency concerns. Therefore, the decision may find that sharing a router 408 is desirable but sharing a supply 406 and physical host 402 is undesirable. A volume in the pool may then be selected that matches these attributes and placed preferably on a same router 408 as the other volumes but not the same physical host 402 or power supply 406. In other examples of placement decisions, such as those relating to a database shard, sharing of infrastructure may be less desirable, and a volume may be selected that has less infrastructure in common with other related volumes.

As discussed, a provider network may provide block-level storage volumes to customers for storage needs or for use with the customer's instances. The storage volumes may persist independently from the lifetime of the customer's instances. The provider network may also allocate storage to instances regardless if the instance is associated with a storage volume. When a customer does not acquire a storage volume, the customer may nevertheless be allocated an amount of storage on the local host when the customer's instance is launched. This storage may be referred to as "ephemeral" or "temporal" because once the customer's instance is terminated, the storage allocated to the customer's instance may be removed or otherwise made unavailable to the customer. For example, the host may disassociate the instance store from the instance.

In one embodiment, if a customer requests a copy of an existing storage volume, whether it is an ephemeral volume or an allocated storage volume, a new storage volume can be created and may be exposed to the customer and treated as a storage volume allocated to the customer. For example, the requested storage volume may be exposed to the host so that the storage volume is treated as one of the storage volumes allocated and available to the customer. The storage volume may then be treated as if it were a virtual disk drive for the customer. Pointers to the backup or redundant copy of the existing storage volume may be used to provide access to the data in the existing storage volume.

In an embodiment, the requested storage volume may be immediately made available to the customer for both reads and writes. A replication process may be initiated so that the data from the redundant copy is copied to the requested storage volume. For example, a Distributed Replicated Block Device (DRBD), copy-on-write setup, or other schemes for distributed replicated storage may be used. Once the requested storage volume has copied all of data from the redundant copy, the requested storage volume may be decoupled from the replication scheme and allowed to function as a full copy. For writes to the original storage volume, the portions of the original storage volume to be written to can be immediately copied to the requested storage volume.

In this way, the requested copy may be made immediately available to the customer without the need to compromise functionality of the redundant copy, and without having to wait for an entire storage volume to be created and copied from the original. In some embodiments, the customer may be provided the option of having the requested copy fully populated using the described copy-before-write scheme, where data is copied from the redundant copy to the requested copy on an as-available basis, which may take longer than a continuous copy of the redundant copy. For example, a new storage volume may be generated in response to a customer request. Although the new storage volume does not yet contain all of the data in the original, pointers to data in the original are used to indicate the correct original data content until all of the data in the original is copied to the new storage volume. When changes are to be made to the original, the locations where the changes are to be made is copied to the new storage volume before the original is changed. Otherwise, the contents of the original storage volume are continuously copied until the copying process is complete. In some embodiments, the customer may be provided the option of accelerating the rate at which data is copied. Pricing incentives may be provided for customers to opt for the as-available copying option.

Figure 5A:
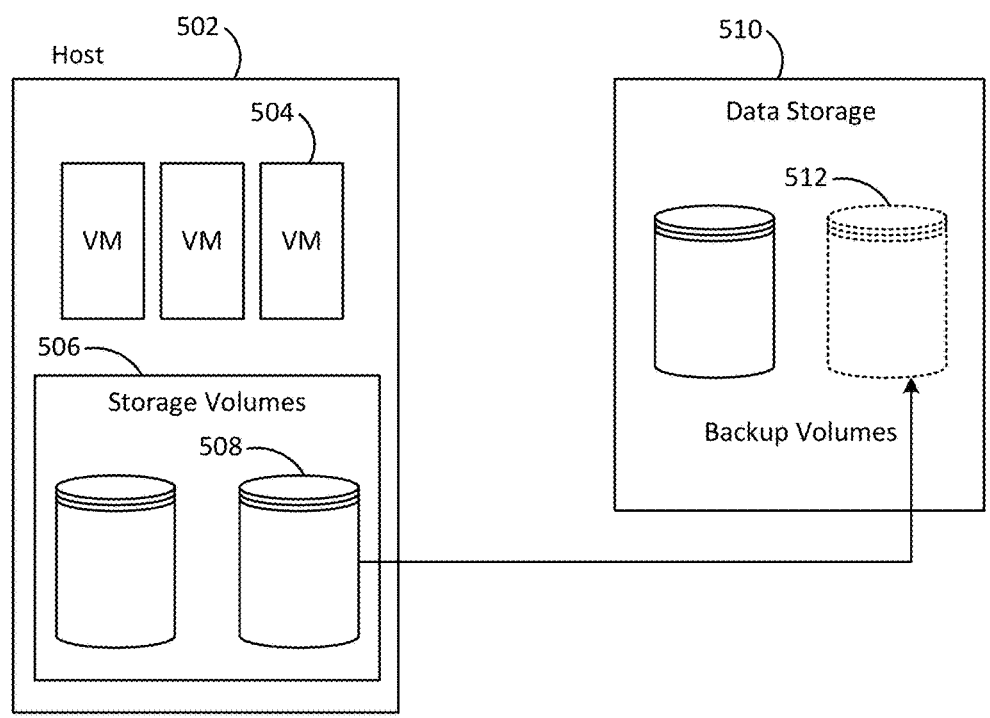
FIG. 5A is a diagram illustrating a mechanism for managing storage resources in accordance with the present disclosure.

Referring to FIG. 5A, illustrated is a host 502 comprising one or more virtual machine instances 504. The host 502 may be a server computer or other computing device. The virtual machine instances 504 may have access to a data store 506 on the host 502. The data store 506 may comprise one or more storage volumes 508. In some cases, data on one of the storage volumes 508 may be associated with one of the virtual machine instances 504.

FIG. 5A also illustrates storage resources 510 that provide block storage resources, such as backup storage volumes 512. Data stored on backup storage volumes 512 may typically be made accessible to a customer in the event of a failure of one or more storage volumes 508 in data store 506. A customer may also submit a request for a copy of one or more of the storage volumes 508 in data store 506. The request may be sent to an interface 101, depicted in FIG. 1, at the provider network. The customer may also send a request for a copy of one or more storage volumes 508 stored in data store 506 to be associated with one or more of the virtual machine instances 504. In response, a new storage volume may be generated, and pointers to one of the backup storage volumes 512 of storage resources 510 that is a backup copy of the requested copy may be used to provide immediate access to the stored data.

Figure 5B:
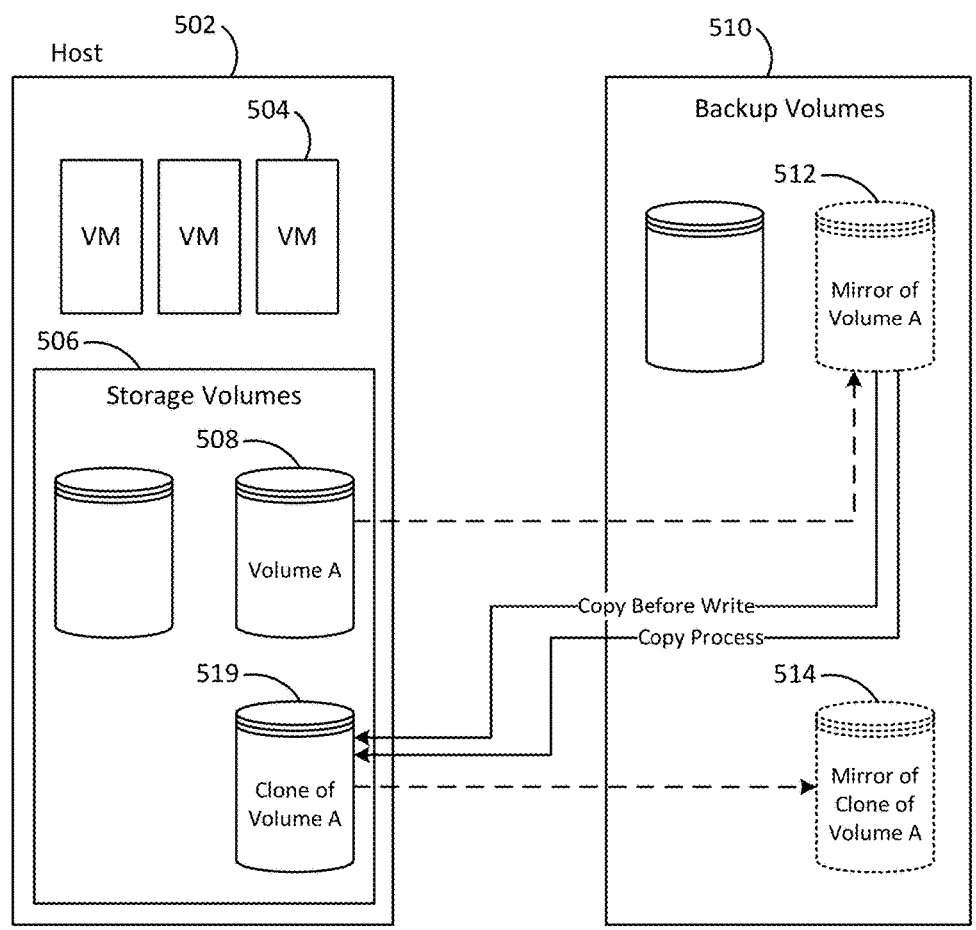
FIG. 5B is a diagram illustrating a mechanism for managing storage resources in accordance with the present disclosure.

Referring to FIG. 5B, a clone of volume A 519 is shown that is a newly generated storage volume in response to a request for a copy of volume A. The clone 519 has pointers to the mirror of volume A 512 so that data access is immediately available to the customer using the pointers. A copy process is initiated so that the contents of volume A is copied to the generated clone of volume A 519. In additional, a copy before write process is initiated so that if a portion of volume A is to be updated (i.e., written to), then the corresponding portion is copied to the clone of volume A 519 prior to the update. Additionally, a mirror of the clone of volume A 514 is generated so that the clone of volume A 519 has a redundant copy. Once the clone of volume A 519 has copied all of the desired data from volume A 508, then any data dependencies between the clone of volume A 519 and volume A 508 may be terminated and pointers are no longer needed to point to data in the mirror of volume A 512.

A user can be provided a user interface for viewing and requesting storage volumes. For example, the user may be able to access a user interface, such as the one shown in FIG. 6. In one embodiment, a customer may utilize a user interface presented by the BDS system manager module 304 of FIG. 3 to create or view the customer's storage volumes and to view or change storage information. For example, as shown in FIG. 6, the BDS system manager module 304 or another module in system 100 of FIG. 1 may present a user interface (UI) 600 to a user in a window 602 of a web browser or other client application executing on the user's computer. The UI 600 may include a listing of storage volumes currently associated with a user, including the name, ID, status, and other information for the storage volumes. The user may also be provided the instance IDs 605 for any associated instances, if the instances are associated with storage volumes. The user interface 600 may also provide details for a selected storage volume 604 that indicates specific details for the selected storage volume. These fields are provided to illustrate examples of possible user interface options that may be provided to a user. As further described herein, additional fields may be provided, and some of the fields may be optional.

In one embodiment, the details for selected storage volume 604 may include a list of available storage volume types 606, which in this example includes types 1, 2, and 4. The details for selected storage volume 604 may further include a selection control, such as the checkbox UI control 607 that allows a user to select one or more of the available volume types 606. The user may also be able to select a command UI control, such as the request copy control 608 shown in FIG. 6. Other methods of selecting and requesting copies of storage volumes through the UI 600 may also be implemented, including selecting a line in the window 602 with a mouse or other input control and selecting a command UI control from a context menu for the selected line, for example.

After selection of request copy control 608, the BDS system manager module 304 or other module may receive the request and initiate processes for preparing and providing a copy of the selected storage volume for the customer. For example, upon selecting the request copy control 608, the backup copy of the selected storage volume may be provided as the requested copy of the storage volume selected in the checkbox UI control 607. Alternatively, if a copy of the selected storage volume was already available, then selection of the request copy control 608 may result in the available copy of the storage volume to be provided to the customer.

Figure 7:
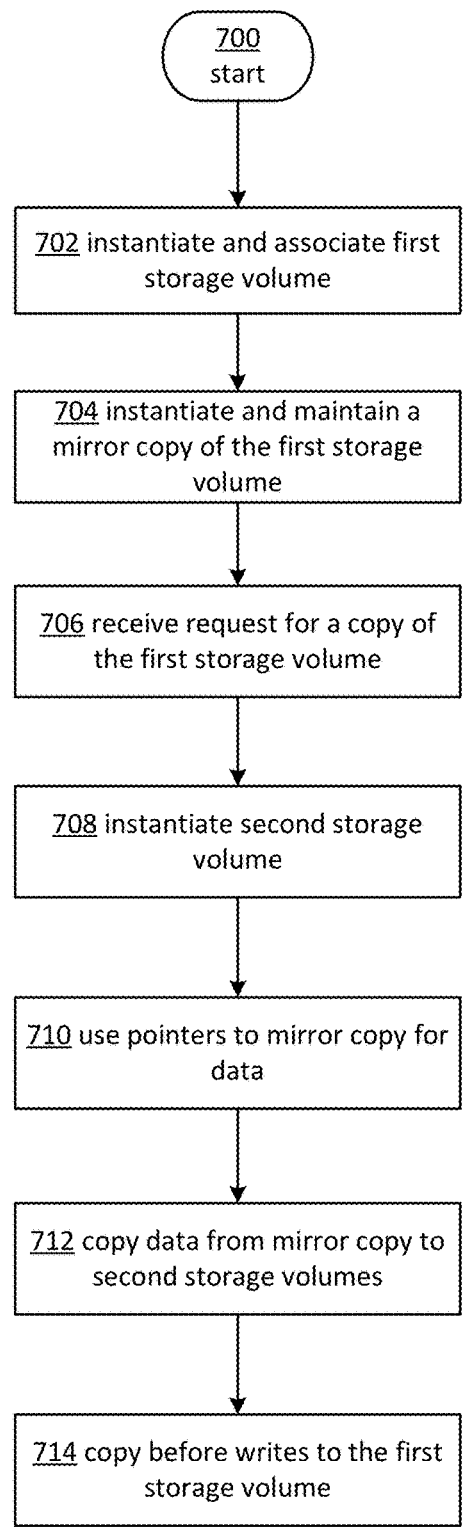
FIG. 7 is a flowchart depicting an example procedure for managing storage resources in accordance with the present disclosure.

FIG. 7 illustrates an example operational procedure for providing computing storage resources of a multi-tenant web services platform. In an embodiment, a mechanism for providing computing resources can be provided by data center 202 in FIG. 2, management system 302 in FIG. 3, or functions executing on one or more components in FIG. 1. The operational procedure may be implemented in a system comprising one or more computing devices. In one embodiment, the system may comprise a multi-tenant web services platform. Referring to FIG. 7, operation 700 begins the operational procedure. Operation 700 may be followed by operation 702. Operation 702 illustrates instantiating a first storage volume on a multi-tenant web services platform. Operation 702 also illustrates associating the first storage volume with a customer of the multi-tenant web services platform. For example, as shown in FIG. 5A, a provider network may provide virtual storage volumes and associate them to a customer's computing instances. The customer may be able to, for example, create a file system on top of the storage volumes, run a database, or otherwise use the storage volumes as a block device.

Operation 702 may be followed by operation 704. Operation 704 illustrates instantiating and maintaining a mirror image of the first storage volume and associating the mirror image for use as a redundant copy of the first storage volume. Operation 704 may be followed by operation 706. Operation 706 illustrates receiving a request for a copy of the first storage volume. The request can be received via interface 101 and a management system, such as management system 302 may process the request.

Operation 706 may be followed by operation 708. Operation 708 illustrates, in response to the request, instantiating a second storage volume and associating the second storage volume with the customer. In some embodiments, the second storage volume is configured to reference the mirror image of the first storage volume for data content, which is illustrated in operation 710. Operation 710 illustrates the example of using pointers to reference the mirror image of the first storage volume. Operation 710 may be followed by operation 712. Operation 712 illustrates modifying the second storage volume by copying data from the mirror image of the first storage volume. In some embodiments, when a portion of the first storage volume is to be changed, a corresponding portion of the mirror image is copied to the second storage volume prior to the change, which is illustrated in operation 714

In an embodiment where replicas of the first and second storage volumes are being generated, a node manager can create a table in memory that maps each unit of storage (e.g., extent, block, sector, etc.) of the virtual disk presented to the customer to a location in the first and second storage volumes. The node manager can then start copying the data in the first and second storage volumes to their replicas and update the table when a unit of storage is copied to the replicas. If a change is made to a unit of storage that is already copied to one of the replicas, the change can be sent to the replica to be applied.

In some embodiments, linking and synchronization of storage volumes may be performed in accordance with one or more policies for storage capacity. The provider network may allow an administrator or customer to set policies for how and when the linking and synchronization of storage volumes are to be performed. Additionally, the provider network may have its own policies for how and when the linking and synchronization of storage volumes are to be performed. For example, the provider network may have maintenance or capacity management policies where storage volumes may be moved in order to allow for take down and maintenance of storage resources. The policies may dictate, for example, that active volumes should be moved to resources with similar performance capabilities. As another example, the web services platform may have policies dictating timing for synchronization and switching of storage volumes. The web services platform may also have policies dictating migration of storage capacity.

As another example, one policy may dictate that a requested copy of a storage volume should be configured based on the rate of I/O access to the storage associated with the customer's instance. The provider network may automatically configure the storage volume to a higher performance storage volume when it is determined that the rate of access to the instance storage has exceeded a predetermined level. In one embodiment, such a policy may be used in conjunction with the autoscaling feature described above, in order to facilitate the scaling of performance of a customer's resources as usage rates, volume, and other parameters change over time. In a likewise fashion, the provider network may automatically configure the copy of the storage volume to a lower performance storage volume when it is determined that the rate of access to the instance storage has fallen below a predetermined level.

Figure 8:
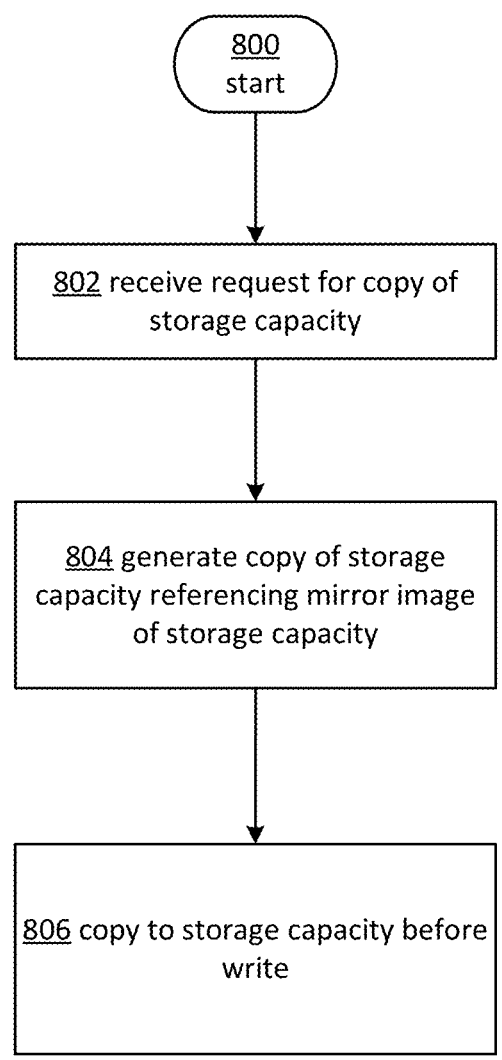
FIG. 8 is a flowchart depicting an example procedure for managing storage resources in accordance with the present disclosure.

FIG. 8 illustrates an example operational procedure for providing computing storage resources of a provider network. In an embodiment, a mechanism for providing computing resources can be provided by management system 202 in FIG. 2 or functions executing on one or more components in FIG. 1. The operational procedure may be implemented in a system comprising one or more computing devices. In one embodiment, the system may comprise a multi-tenant web services platform. Referring to FIG. 8, operation 800 begins the operational procedure. Operation 800 may be followed by operation 802. Operation 802 illustrates receiving a request for a copy of a first allocated storage capacity associated with a customer. In some embodiments, a mirror image of the first allocated storage capacity is maintained as a redundant copy of the first allocated storage capacity.

Operation 802 may be followed by operation 804. Operation 804 illustrates in response to the request, generating a second allocated storage capacity as the requested copy. In some embodiments, the second allocated storage capacity is configured to reference the mirror image of the first allocated storage capacity when the second allocated storage capacity is accessed.

Operation 804 may be followed by operation 806. Operation 806 illustrates modifying the second allocated storage capacity by copying data from the mirror image of the first allocated storage capacity to the second allocated storage capacity. In some embodiments, when a portion of the first allocated storage capacity is to be written to and has not been copied to the second allocated storage capacity, a corresponding portion of the mirror image is copied to the second allocated storage capacity prior to the write.

Figure 9:
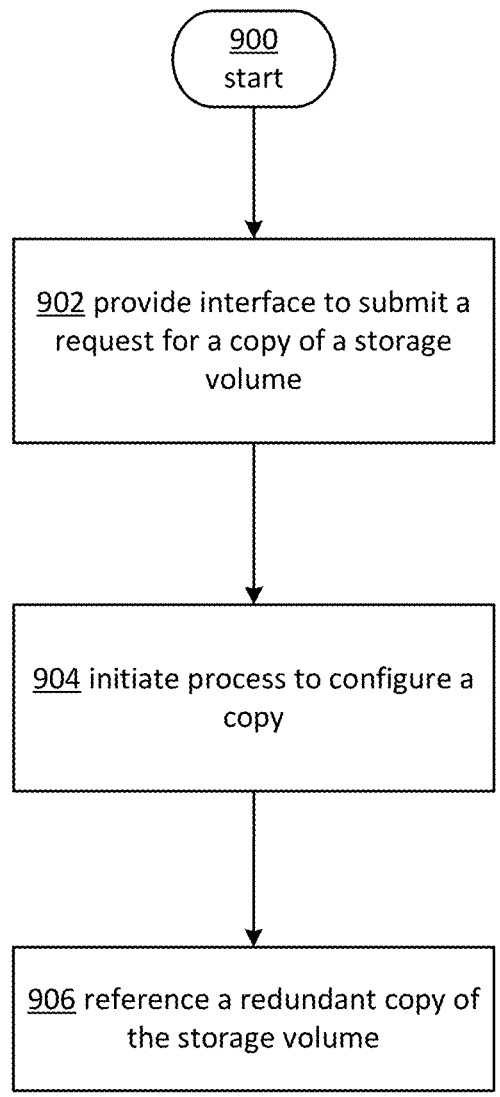
FIG. 9 is a flowchart depicting an example procedure for managing storage resources in accordance with the present disclosure.

FIG. 9 illustrates an example operational procedure for providing computing storage resources of a provider network. In an embodiment, a mechanism for providing computing storage resources can be provided by data center 202 in FIG. 2 or functions executing on one or more components in FIG. 1. The operational procedure may be implemented in a system comprising one or more computing devices. In one embodiment, the system may comprise a multi-tenant web services platform. Referring to FIG. 9, operation 900 begins the operational procedure. Operation 900 may be followed by operation 902. Operation 902 illustrates providing an interface to submit a request for a copy of a virtualized storage volume allocated to a customer from a set of physical storage devices of the provider network.

Operation 902 may be followed by operation 904. Operation 904 illustrates, in response to the request, initiating a process to configure a redundant virtualized copy of the allocated storage volume to be accessible as the copy requested by the customer. In some embodiments, the requested copy is allocated from the set of physical storage devices and is configured to reference the redundant copy for data content, which is illustrated in operation 906.

In some embodiments, an API or a programming interface sub-system may be provided for facilitating the submission of requests pertaining to storage volumes. The API may be configured to receive first electronic messages that encode identifiers indicative of requests. In response to receiving one of the electronic messages, the API may send second electronic messages indicative of information pertaining to the requests.

In some embodiments, the techniques described herein may be applied to providing copies of storage volumes having arbitrary attributes. For example, a copy of a storage volume may be provided that has a different IOPS or a different storage capacity than the original storage volume.

The various embodiments can further be implemented in a wide variety of operating environments, which in some cases can include one or more user computers, computing devices, or processing devices, which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes, such as development and database management. These devices also can include other electronic devices, such as dummy terminals, thin-clients, gaming systems, and other devices capable of communicating via a network. Such systems may comprise at least one memory that bears instructions that, upon execution by at least one processor, cause the system to effectuate certain results as described herein.

Most embodiments utilize at least one network that would be familiar to those skilled in the art for supporting communications using any of a variety of commercially available protocols, such as TCP/IP (transmission control protocol/internet protocol), OSI (open systems interconnection), FTP (file transfer protocol), UPnP (universal plug and play), NFS (network file system), CIFS (common Internet file system), and AppleTalk®. The network can be, for example, a local area network, a wide area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, CGI servers, data servers, Java® servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle °, Microsoft®, Sybase® and IBM®.

The environment can include a variety of data stores and other memory and storage media as discussed above. These can reside in a variety of locations, such as on a non-transitory computer-readable medium local to (and/or resident in) one or more of the computers, or remote from any or all of the computers across the network. In a particular set of embodiments, the information may reside in a storage area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and a working memory as described above. The computer-readable storage media reader can be connected with, or configured to receive, a computer-readable storage medium—representing remote, local, fixed, and/or removable storage devices—as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It may be appreciated that alternate embodiments may have numerous variations from that described above. For example, customized hardware might also be used and/or particular elements might be implemented in hardware, software (including portable software, such as applets), or both. Further, connection to other computing devices, such as network input/output devices, may be employed.

Storage media and computer readable media for containing code, or portions of code, can include any appropriate media known or used in the art, including storage media and communication media, such as but not limited to non-transitory, volatile and non-volatile, and removable and non-removable media implemented in any method or technology for storage and/or transmission of information, such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium that can be used to store the desired information and that can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It may be understood, however, that there is no intention to limit the embodiments to the specific form or forms disclosed, but on the contrary, the intention is to cover all modifications, alternative constructions, and equivalents falling within the spirit and scope of the embodiments, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the embodiments unless otherwise claimed. No language in the specification should be construed as indicating any non-claimed element as essential to the practice of the embodiments.

Preferred embodiments of this disclosure are described herein, including the best mode known to the inventors for carrying out the embodiments. Variations of those preferred embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, these embodiments include all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   instantiating a first storage volume on a multi-tenant web services platform;
   associating the first storage volume with a customer of the multi-tenant web services platform;
   instantiating and maintaining a mirror image of the first storage volume and associating the mirror image for use as a redundant copy of the first storage volume;
   receiving a request for a copy of the first storage volume;
   in response to the request, instantiating a second storage volume and associating the second storage volume with the customer, wherein the second storage volume is configured to reference the mirror image of the first storage volume for data content; and
   modifying the second storage volume by copying data from the mirror image of the first storage volume, wherein when a portion of the first storage volume is to be changed, a corresponding portion of the mirror image is copied to the second storage volume prior to the change.

2. The method of claim 1, further comprising presenting the second storage volume as a mapped storage volume.

3. The method of claim 1, further comprising providing a user option to copy data from the mirror image of the first storage volume to the second storage volume at an accelerated rate.

4. The method of claim 3, further comprising maintaining continuity of input/output operations of the first and second storage volumes during the modifying.

5. The method of claim 1, wherein the instantiating and modifying is performed in accordance with at least one policy for providing copies of storage volumes.

6. A system, comprising:
   at least one memory having stored therein computer instructions that, upon execution by one or more processors of the system, at least cause the system to:
   receive a request for a copy of a first allocated storage capacity associated with a customer, wherein a mirror image of the first allocated storage capacity is maintained as a redundant copy of the first allocated storage capacity;
   in response to the request, generate a second allocated storage capacity as the requested copy, wherein the second allocated storage capacity is configured to reference the mirror image of the first allocated storage capacity when the second allocated storage capacity is accessed; and
   modify the second allocated storage capacity by copying data from the mirror image of the first allocated storage capacity to the second allocated storage capacity, wherein when a portion of the first allocated storage capacity is to be written to and has not been copied to the second allocated storage capacity, a corresponding portion of the mirror image is copied to the second allocated storage capacity prior to the write.

7. The system of claim 6, wherein the first allocated storage capacity and the second allocated storage capacity are block level storage volumes.

8. The system of claim 6, further comprising computer instructions that, upon execution by one or more processors of the system, at least cause the system to back up the second allocated storage capacity.

9. The system of claim 8, further comprising computer instructions that, upon execution by one or more processors of the system, at least cause the system to provide the customer with an option pertaining to a time frame for copying data from the mirror image of the first allocated storage capacity to the second allocated storage capacity, wherein data dependency between the first allocated storage capacity and the second allocated storage capacity is terminated when the copying is complete.

10. The system of claim 9, wherein the second allocated storage capacity is provided without altering the mirror image's function as a redundant copy of the first allocated storage capacity.

11. The system of claim 8, wherein the backing up is performed using a mirroring scheme or replicated storage scheme.

12. The system of claim 9, further comprising computer instructions that, upon execution by one or more processors of the system, at least cause the system to maintain continuity of input/output operations for the first and second allocated storage capacities while the data from the mirror image of the first allocated storage capacity is copied to the second allocated storage capacity.

13. The system of claim 6, wherein the second allocated storage capacity is configured in accordance with at least one policy for providing copies of storage capacity.

14. The system of claim 6, wherein the second allocated storage capacity is made available as a mapped storage volume.

15. The system of claim 6, wherein the second allocated storage capacity is configured based on a usage rate of the second allocated storage capacity.

16. A non-transitory computer-readable storage medium having stored thereon computer-readable instructions, the computer-readable instructions comprising instructions that upon execution on one or more computing devices, at least cause the one or more computing devices to:
   provide an interface to submit a request for a copy of a virtualized storage volume allocated to a customer from a set of physical storage devices of a provider network; and
   in response to the request, initiate a process to configure a redundant virtualized copy of the allocated virtualized storage volume to be accessible as the copy requested by the customer, wherein the requested copy is allocated from the set of physical storage devices and is configured to reference the redundant virtualized copy for data content, wherein when a portion of the allocated virtualized storage volume is to be modified and has not been copied to the requested copy, a corresponding portion of the redundant virtualized copy is copied to the requested copy prior to the modification.

17. The non-transitory computer-readable storage medium of claim 16, further comprising instructions that upon execution on one or more computing devices, at least cause the one or more computing devices to copy data from the redundant virtualized copy to the requested copy.

18. The non-transitory computer-readable storage medium of claim 16, wherein the interface is an application programming interface configured to:
   receive first electronic messages that encode identifiers indicative of the request; and in response to receiving one of the first electronic messages, send second electronic messages indicative of information pertaining to the allocated virtualized storage volume and the redundant virtualized copy.

19. The non-transitory computer-readable storage medium of claim 16, wherein the requested copy is presented as a new storage volume that is accessible by the customer.

20. The non-transitory computer-readable storage medium of claim 16, wherein the requested copy is made available as a mapped storage volume.

* * * * *